July 8, 1969 G. KIPER 3,453,942
EXPOSURE CONTROL FOR PHOTOGRAPHIC CAMERAS
Filed Oct. 19, 1966 Sheet 1 of 2

INVENTOR.
GERD KIPER
BY
Michael J. Striker
Attorney

United States Patent Office 3,453,942
Patented July 8, 1969

3,453,942
EXPOSURE CONTROL FOR PHOTOGRAPHIC CAMERAS
Gerd Kiper, Unterhaching, Germany, assignor to Agfa-Gevaert Aktiengesellschaft, Leverkusen, Germany
Filed Oct. 19, 1966, Ser. No. 587,904
Claims priority, application Germany, Oct. 29, 1965, A 50,646
Int. Cl. G01j *1/10;* G03b *9/00*
U.S. Cl. 95—10                                      20 Claims

ABSTRACT OF THE DISCLOSURE

An automatic exposure control for photographic cameras which determines the exposure time and aperture size as a function of scene brightness during operation in daylight and automatically furnishes an appropriate exposure time for operation with flash. A selector can move between two ranges of positions, without changing the aperture size, to respectively set the camera for operation in daylight and for operation with flash. A cam on one of two diaphragm setting rings which are biased in opposite directions adjusts the shutter so that the latter is set to furnish the longest or the shortest exposure time when the camera is ready for operation in daylight. The one setting ring is then adjustable as a function of scene brightness to thereby select an appropriate aperture size in response to movement relative to the other setting ring and to select an appropriate exposure time by way of the cam.

---

Figure 1:
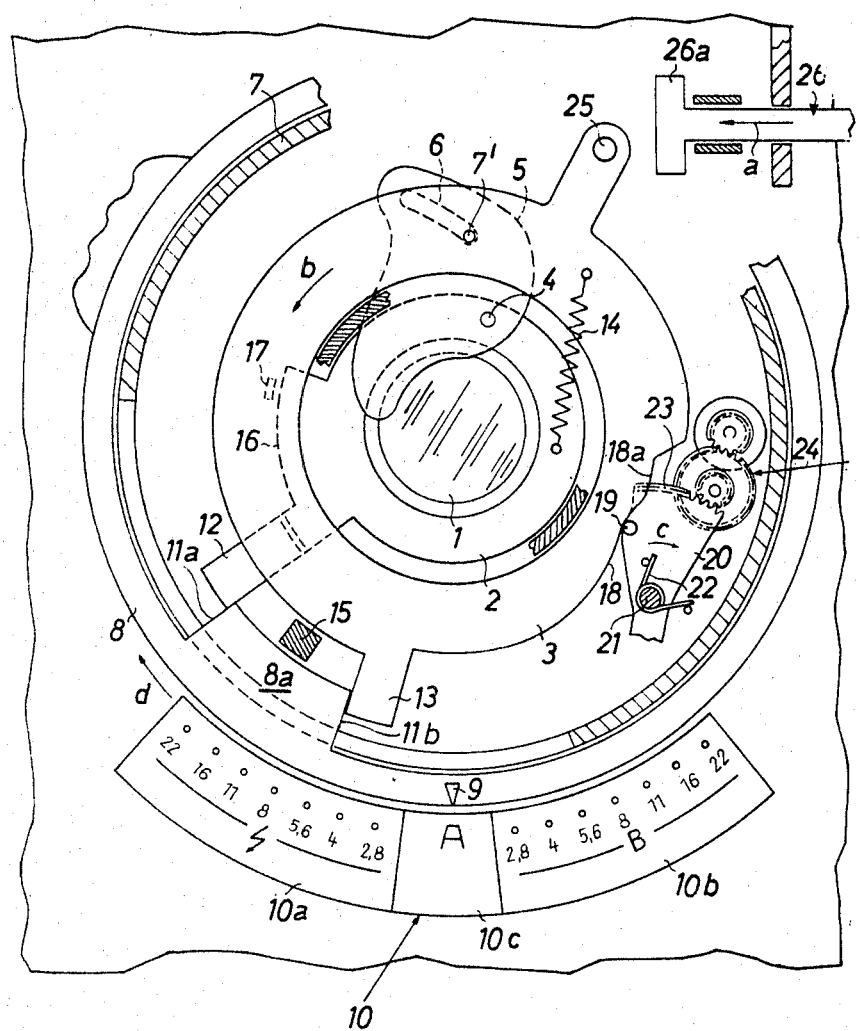

The present invention relates to photographic cameras in general, and more particularly to improvements in exposure controls for photographic cameras. Still more particularly, the invention relates to improvements in exposure controls of the type wherein the diaphragm comprises a set of blades adjustable by two preferably ring-shaped setting members which are movable with reference to each other to thereby change the size of the diaphragm aperture.

In presently known cameras of the just outlined character, the range of exposure times is selected in such a way that the longest exposure time during automatic operation of the camera (usually 1/30 of a second) is the same as the exposure time which is selected by the exposure control for operation with flash.

It is an important object of the present invention to provide an exposure control which can furnish a larger number of different combinations of exposure time and diaphragm aperture without unduly complicating the construction of the exposure control.

Another object of the invention is to provide an exposure control which, during automatic selection of at least one exposure value, can furnish longer exposure times than the exposure controls of presently known design.

A further object of the invention is to provide an exposure control which will automatically select an optimum exposure time when the camera is set for operation with flash.

An additional object of the invention is to provide an exposure control which, in addition to setting the camera for automatic operation and operation with flash, can also set the camera for manual selection of exposure values.

Briefly stated, one feature of my invention relates in the provision of a photographic camera, for example, a still camera, which comprises a diaphragm including blade means movable between a plurality of positions to thereby select the size of the diaphragm aperture, a pair of setting members movable with and relative to each other and coupled with the blade means to effect changes in the size of aperture in response to movement relative to each other, and biasing means for urging the setting members in opposite directions, manually operated selector means adapted to move at least one of the setting members with reference to the other setting member and movable between at least two ranges of positions in one of which the camera is set for automatic operation (i.e., for automatic selection of the aperture and exposure time as a function of the intensity of scene light) and in the other of which the camera is set for operation with flash whereby the position of the setting members relative to each other remains unchanged while the selector means moves between the two ranges of positions, exposure time determining means preferably comprising cam means provided on the other setting member and retarding means adjustable by the cam means between two end positions respectively corresponding to the longest and shortest exposure times and assuming one of such end positions when the selector means is moved to the one range of positions (i.e., when the camera is set for automatic operation), and photoresponsive means for moving the other setting member in the one range of positions of the selector means as a function of the intensity of scene light to thereby select the size of the aperture in response to movement of the other setting member relative to the one setting member and to simultaneously select the exposure time in response to adjustment of the retarding means by the cam means.

The selector means is preferably also movable to a third range of positions to thereby effect manual selection of exposure values. The other and third ranges of positions of the selector means are preferably located at the opposite sides of the one range, and such one range may include a single position of the selector means.

The selector means and the setting members may be constituted by concentric rings which are rotatable back and forth about the optical axis of the camera objective and the selector means may comprise two motion transmitting portions which abut against complementary projections provided on the setting members when the camera is set for automatic operation. The aforementioned biasing means then urges the two projections against the respective motion transmitting portions.

Figure 2:
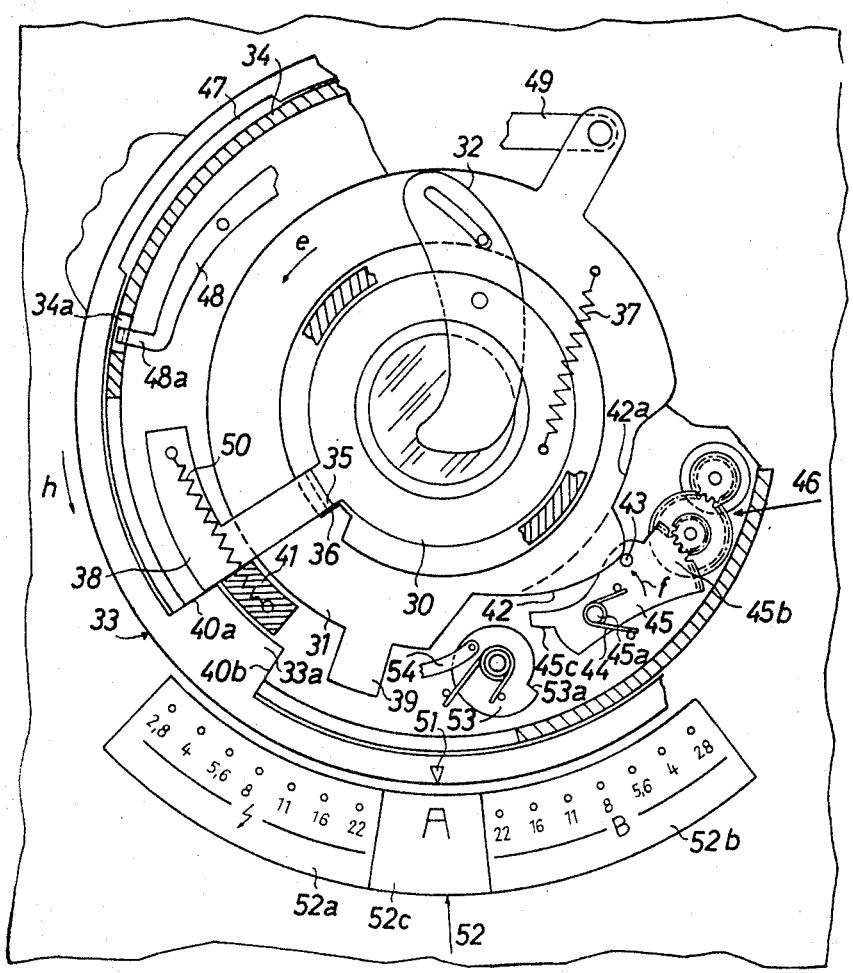

The novel features which are considered as characteristic of the invention are set forth in particular in the appended claims. The improved camera itself, however, both as to its construction and its mode of operation, together with additional features and advantages thereof, will be best understood upon perusal of the following detailed description of certain specific embodiments with reference to the accompanying drawings, in which:

FIG. 1 is a fragmentary diagrammatic front elevational view of a still camera which embodies one form of my invention; and FIG. 2 is a similar fragmentary front elevational view of a modified camera.

Referring first to FIG. 1, there is shown a portion of a still camera comprising an objective 1 and a diaphragm including a set of diaphragm blades 5 (only one shown) and two setting rings 2, 3 which are rotatable about the optical axis and are coupled to the blades. The coupling means comprises a first pivot pin 4 on the setting ring 2, an elongated guide slot 6 in the blade, and a second pivot pin 7' provided on the setting ring 3 and extending into the corresponding guide slot 6. The angular position of the blades 5 will be changed only when the setting rings 2, 3 are caused to turn with reference to each other whereby the blades define different diphragm apertures.

The just described diaphragm 2, 3, 5 is accommodated in the housing 7 of a shutter which is not shown in its entirety. FIG. 1 merely illustrates a mechanism for determining the exposure time including a cam 18 provided on the setting ring 3 and serving to rock a control lever 20 which regulates a conventional retarding mechanism 24. The housing 7 of the shutter carries a manually opearble ring-shaped selector 8 which can be moved to three ranges of positions whereby its index 9 travels along a fixed scale 10 having a median section 10c provided with a single symbol A which indicates that the camera is set for automatic operation (namely, for automatic selection of exposure values including the size of the diaphragm aperture and the exposure time), a lefthand section 10a which is provided with graduations indicating different sizes of the diaphragm aperture and with a symbol indicating that the camera is set for operation with flash, and a third section 10b provided with graduation indicating different sizes of the aperture and a symbol B indicating that the camera is set for manual selection of the size of the diaphragm aperture. The two sets of graduations on the scale sections 10a, 10b are mirror symmetrical with reference to a plane including the optical axis and passing through the symbol A.

The selector 8 is provided with a radially inwardly extending projection 8a having two motion transmitting shoulders 11a, 11b which respectively abut against radially outwardly extending projections or lugs 12, 13 of the setting rings 2 and 3. A single helical contraction spring 14 connects the setting rings and urges the lugs 12, 13 against the respective shoulders 11a, 11b. When the camera is set for automatic selection of exposure values (i.e., when the index 9 registers with the symbol A on the median scale section 10c), the lugs 12, 13 are free to abut against the respective shoulders 11a, 11b and are spaced from a fixed abutment or stop 15 provided on the housing 7.

The setting ring 2 has an edge portion 16 which can block the operation of a retaining lever 17. In a well known manner, the retaining lever 17 will move radially toward the objective 1 whenever the shutter is released. When the selector 8 sets the camera for automatic operation or for operation with flash, the edge portion 16 extends into the path of the lever 17 so that the latter cannot reach its radially innermost position. However, when the lever 17 can move to such innermost position, it holds the shutter in open position and is disengaged from the shutter only in response to return movement of the shutter release trigger. Thus, the lever 17 can keep the shutter open for a period of time which the operator himself determines, i.e., independently of the cam 18 and lever 20. This lever 20 has a follower 19 which tracks the cam 18 of the setting ring 3. A torsion spring 22 which is convoluted around the shaft 21 of the lever 20 tends to turn the latter in a counterclockwise direction so that the follower 19 remains in engagement with the face of the cam 18. A toothed segment 23 of the lever 20 meshes with a pinion of the retarding mechanism 24.

The setting ring 3 is provided with a further projection or arm 25 which extends into the path of an output member 26a forming part of a conventional photoresponsive device 26 which can select the exposure time and the size of the diaphragm aperture as a function of the intensity of scene light.

When the photoresponsive device 26 is on and the selector 8 has been adjusted by hand to place the index 9 into registery with the symbol A on the median scale section 10c the output member 26a will travel in the direction indicated by arrow a as soon as the release trigger (not shown) is depressed. This output member 26a then bears against the arms 25 and turns the setting ring 3 in a counterclockwise direction (arrow b). The extent of angular displacement of the ring 3 is a function of the intensity of scene light. The setting ring 2 cannot follow the bias of the spring 14 because its lug 12 abuts against the shoulder 11a of the selector 8; therefore, the blades 5 will change their angular position and will define an aperture whose size is also a function of the intensity of scene light. As the setting ring 3 turns in response to leftward movement of the output member 26a, the cam 18 rocks the control lever 20 in a clockwise direction (arrow c) to reduce the retarding or delaying action of the mechanism 24 in a manner well known from the art and not specifically shown in FIG. 1. For example, when the follower 19 engages the deepmost portion of the face on the cam 18 (this position of the follower 19 is actually shown in FIG. 1), the retarding mechanism 24 is set to furnish an exposure time of ⅛ of a second. When the follower 19 is engaged by the radially outermost portion of the face on the cam 18, the mechanism 24 will be set to furnish an exposure time of ½₀₀ of a second. The just mentioned values are given only by way of example.

When the exposure with automatic selection of exposure values is completed, the output member 26a moves away from the arm 25 and the spring 14 is free to return the lug 13 of the setting ring 3 into abutment with the shoulder 11b of the selector 8. The spring 14 will store energy whenever the setting ring 3 is caused to move its lug 13 away from the shoulder 11b.

If the user thereupon wishes to make an exposure with flash, the selector 8 is turned in a clockwise direction (arrow d) so that the index 9 registers with a selected graduation on the scale section 10a. During such manual turning of the selector 8, the setting ring 3 follows the projection 8a until its lug 13 reaches the stop 15. From then on, the shoulder 11b will move away from the lug 13 but the shoulder 11a will continue to turn the lug 12 so that the setting ring 2 continues to turn with the selector 8. The initial position for making exposures with flash will be reached when the lug 13 engages the stop 15; the index 9 then registers with the graduation "2.8" on the scale section 10a. Other sizes of the diaphragm aperture for operation with flash will be selected by additional turning of the selector 8 in a clockwise direction (arrow d) in order to move the shoulder 11b away from the lug 13 and to place the index 9 into registry with one of the remaining graduations on the scale section 10a. The size of the dipahragm will be changed because the ring 2 then rotates with reference to the ring 3.

While the lug 13 moves toward the abutment 15, the cam 18 rocks the follower 19 and control lever 20 in a clockwise direction until the follower 19 reaches the portion 18a of the cam face. Such position of the control lever 20 corresponds to a predetermined optimum exposure time for operation with flash, for example ⅓₀ of a second. Otherwise stated, the distance between the symbol A and the rightmost graduation "2.8" on the scale section 10a is such that the retarding mechanism 24 is moved from a position corresponding to the maximum exposure time (⅛ of a second) to an optimum exposure time (⅓₀ of a second) for operation with flash. The exposure time for operation with flash is always the same, regardless of the position of the index 9 with reference to the scale section 10a, because the stop 15 holds the setting ring 3 against further clockwise rotation. However, the operator can select any desired size of the diaphragm aperture, simply by manipulating the selector 8 until the index 9 registers with a selected graduation on the scale section 10a.

If the operator wishes to manually select the size of the diaphragm aperture during operation without flash, the selector 8 is turned in a counterclockwise direction until the index 9 registers with a selected graduation on the righthand scale section 10b. The ring 2 will follow such movement until the lug 12 reaches the stop 15. Such engagement will take place when the index 9 registers with the graduation "2.8" of the scale section 10b whereby the operator knows that the diaphragm has been set to furnish an aperture of maximum size. Further turning of the selector 8 in a counterclockwise direction will result in movement of setting ring 3 relative to the setting ring 2 will resultant changes in the size of the diaphragm aperture (such changes will be pointed out by the index 9)

and with commensurate changes in the exposure time (determined by the angular position of the control lever 20). Longer exposure times (exceeding 1/8 of a second) can be furnished in response to actuation of the lever 17.

The spring 14 insures that the lugs 12 and 13 invariably abut against the respective shoulders 11a, 11b of the selector 8 or that the lug 12 or 13 respectively engages the stop 15 when the lug 13 or 12 respectively abuts against the shoulder 11b or 11a. The relative position of setting rings 2, 3 remains unchanged during travel of the index 9 from registry with the symbol A into registry with the graduation "2.8" on the scale section 10a or 10b.

The retaining lever 17 is blocked by the setting ring 2 when the index 9 registers with the scale section 10a or 10c. The provision of the edge portion 16 on the setting ring 2 is of advantage because of the shutter housing 7 need not be provided with cutouts for the retaining lever 17 because the latter is fully accommodated in this housing.

Referring now to FIG. 2, there is shown a modified diaphragm which again comprises blades 32 (only one shown) coupled with two concentric setting rings 30, 31 in the same way as described in connection with FIG. 1. A selector 33 is rotatable on the housing 34 of the shutter and comprises a radially inwardly extending projection 33a provided with two motion transmitting shoulders 40a, 40b. The rings 30, 31 comprise cooperating projections or tongues 35, 36 which are urged against each other by a helical spring 37 tending to rotate these rings in opposite directions. The rings 30, 31 are provided with additional radially outwardly extending projections or lugs 38, 39 which can respectively abut against the shoulders 40a, 40b of the projection 33a. The arrangement is such that the lug 38 can abut against the shoulder 40a when the lug 39 is spaced from the shoulder 40b, and vice versa. Each of the lugs 38, 39 can be further moved into engagement with a fixed abutment or stop 41. A helical contraction spring 50 operates between the stop 41 and lug 38 to bias the ring 30 in a counterclockwise direction (arrow e) whereby the lug 38 abuts against the shoulder 40a and stop 41 when the index 51 of the selector 33 is placed in registry with the symbol A on the median section 52c of a fixed scale 52. The ring 31 tends to rotate with the ring 30 (under the bias of the spring 50) because the spring 37 tends to maintain the tongue 36 in engagement with the tongue 35.

The ring 31 is provided with an exposure time determining cam 42 which cooperates with a follower 43 on a control lever 45 rockable on a fixed shaft 45a and biased by a torsion spring 44. The spring 44 maintains the follower 43 in abutment with the face of the cam 42. A toothed segment 45b of the control lever 45 meshes with a pinion of a retarding mechanism 46. In the position shown in FIG. 2 in which the camera is set for automatic selection of exposure values because the index 51 registers with the symbol A, a lobe of the cam 42 maintains the control lever 45 in its right-hand end position in which the torsion spring 44 stores maximum energy and the retarding mechanism 46 is set to provide a minimal retarding action (shortest exposure time). This novel feature is equally useful in many other types of cameras with automatic exposure controls.

The selector 33 is provided with an elongated arcuate slot 47 which can receive an exposure time determining retaining lever 48 having an end portion 48a which can extend through a slot 34a in the housing 34. The function of the lever 48 is the same as that of the retaining lever 17 shown in FIG. 1. The numeral 49 denotes the output member of a photoresponsive device corresponding to the device 26 of FIG. 1 and adapted to select the exposure values as a function of the intensity of scene light. The output member 49 is articulately coupled to the setting ring 31, i.e., to that setting ring which is provided with the exposure time determining cam 42. The aforementioned scale 52 comprises two additional sections 52a, 52b which respectively correspond to the sections 10a, 10b of the scale 10 and are provided with analogous symbols and graduations. However, the graduations "22" indicating the smallest size of the diaphragm aperture are immediately adjacent to the median scale section 52c.

In FIG. 2, parts are shown in positions they assume when the camera is set for automatic operation. The index 51 of the selector 33 registers with the symbol A on the median scale section 52c and the lug 38 of the setting ring 30 abuts not only against the shoulder 50a but also against the stop 41 because it is urged thereagainst by the spring 50. The spring 37 maintains the tongue 36 of the setting ring 31 in abutment with the tongue 35 of the ring 30. As stated before, the follower 43 of the control lever 45 then engages the tip of a lobe on the cam 42 so that the retarding mechanism 46 is set to provide a minimal retarding action. In response to depression of the customary release trigger, the output member 49 of the photoresponsive device turns the setting ring 31 in a counterclockwise direction (arrow e) through an angle which is a function of the intensity of scene light. The setting ring 30 remains in the illustrated position because its lug 38 bears against the fixed stop 41 and shoulder 40a. Therefore, the ring 31 changes the angular position of the diaphragm blades 32 which then select an aperture whose size is a function of the intensity of scene light. The cam 42 turns with reference to the follower 43 which is rocked with the control lever 45 (arrow f) under the bias of the torsion spring 44 whereby the retarding mechanism 46 selects an appropriate exposure time. When the parts assume the positions shown in FIG. 2, the blades 32 define an aperture of minimal size and the retarding mechanism 46 provides an exposure time of shortest duration. This is contrary to the operation of the camera shown in FIG. 1 wherein the setting for automatic operation places the retarding mechanism 24 into a condition to provide the longest exposure time.

When the exposure with automatic determination of exposure time and diaphragm aperture is completed, the output member 49 allows the spring 37 to contract and to return the tongue 36 into engagement with the tongue 35.

For making an exposure with flash, the selector 33 will be turned in a clockwise direction until the index 51 moves into registry with a selected graduation on the left-hand scale section 52a. Initially, the setting rings 30, 31 follow such movement of the selector 33 until the lug 39 reaches the stop 41. This arrests the setting ring 31 but the ring 30 can continue to turn with the selector 33 until the index 51 reaches a selected graduation on the scale section 52a. When the lug 39 reaches the stop 41, the index 51 registers with the graduation "22" which indicates a minimum size of the diaphragm aperture. The follower 43 of the control lever 45 then engages a portion 42a on the face of the cam 42 whereby the lever 45 sets the retarding mechanism 46 to furnish an optimum exposure time (for example, 1/30 of a second) for operation with flash. Such exposure time then remains unchanged because the lug 39 continues to abut against the stop 41, regardless of which graduation on the scale section 52a registers with the index 51.

To make an exposure with manual selection of both exposure values, the operator will turn the selector 33 in a counterclockwise direction (arrow h) until the index 51 registers with a selected graduation on the scale section 52b. When the selector 33 begins to move from the position shown in FIG. 2, it rotates independently of the setting rings 30, 31 until the shoulder 40b reaches the lug 39. At such time, the index 51 registers with the graduation "22" of the scale section 52b whereby the operator knows that the size of the diaphragm aperture is minimal. This is the same setting as for automatic operation. The exposure time and the size of the diaphragm aperture will be changed if the operator continues to turn the selector 33 in a counterclockwise direction so that the shoulder 40b entrains the lug 39 and turns the ring 31 with reference to the ring 30 to increase the size of the diaphragm aperture. The ring 30 remains stationary because its lug 38 continues to abut against the stop 41. The cam 42 sets the retarding mechanism 46 so that a different exposure time corresponds to each manually selected size of the diaphragm aperture.

An important advantage of the camera shown in FIG. 2 is that the photoresponsive device including the output member 49 can turn the setting ring 31 by exertion of a very small force. This is due to the fact that the output member 49 must overcome only the bias of the relatively weak spring 37 but not the opposition of the retarding mechanism 46 and spring 44. On the contrary, the spring 44 will actually assist the output member 49 in turning the setting ring in a counterclockwise direction (arrow e) because the follower 43 will travel along an inwardly sloping portion of the face on the cam 42. Such arrangement also prevents the spring 44 from rapidly propelling the control lever 45 in response to desirable rapid adjustment of the setting ring 31 by the output member 49 when the shutter release trigger is depressed while the index 51 registers with the symbol A of the scale 52. This reduces the likelihood of inaccurate adjustment of exposure values.

FIG. 2 further shows the main drive member 53 of the shutter and the manner in which the control lever 45 influences the drive member 53. When the shutter release trigger is actuated, the drive member 53 turns in a counterclockwise direction whereby its shoulder 53a moves into short-lasting engagement with a shoulder 45c of the control lever 45. Such short interval of actual engagement between the shoulders 45c and 53a is terminated in response to small clockwise rotation of the control lever 45. Depending on the initial distance between the follower 43 and the optical axis, namely, on the setting of the cam 42 prior to actuation of the shutter release trigger, the shoulder 45c will require a longer or a shorter interval of time to move away from the path of the shoulder 53a. Thus, if the setting ring 31 has been rotated in the direction indicated by arrow e so that the follower 43 tracks a portion of the lobe on the cam 42 which is rather close to the optical axis, the control lever must rotate in a clockwise direction through a relatively large angle before its shoulder 45c moves away from the shoulder 53a.

In order to rotate in a clockwise direction, the control lever 45 must overcome the inertia of the components of the retarding mechanism 46 and the bias of the torsion spring 44. However, when the setting ring 31 is adjusted in the direction indicated by arrow e, it need not overcome the bias of the spring 44. This brings about the aforediscussed advantage that the spring 44 actually assists the output member 49 in adjusting the setting ring 31 in a counterclockwise direction. The spring 44 stores a maximum amount of energy when the selector 33 sets the camera for automatic operation. The retarding mechanism 46 is then in a condition in which it can bring about a minimal retarding action.

The drive member 53 is coupled with a customary control ring for shutter blades which is not shown in FIG. 2. This illustration merely shows a motion transmitting link 54 which couples the control ring with the drive member 53. The control ring turns back and forth during each exposure.

It is clear that the camera shown in FIG. 1 or 2 is susceptible of many additional modifications without departing from the spirit of my invention. For example, the structure may be simplified considerably if the camera is constructed to operate either automatically or with flash, i.e., if the scales 10 and 52 need not have the sections 10b and 52b.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is:

1. In a photographic camera, a diaphragm comprising blade means movable between a plurality of positions to thereby select the size of the aperture, a pair of setting members movable with and with reference to each other and coupled to said blade means to effect changes in the size of the aperture in response to movement with reference to each other, and biasing means for urging said setting members in opposite directions; manually operated selector means for moving at least one of said setting members with reference to the other setting member and being movable between at least two ranges of positions in one of which the camera is set for automatic operation and in the other of which the camera is set for operation with flash, said selector means comprising motion transmitting means cooperating with said biasing means to move said setting members in response to movement of said selector means between said ranges of positions whereby the position of said setting members with reference to each other remains unchanged; exposure time determining means comprising cam means provided on the other setting member and retarding means adjustable by said cam means between two end positions respectively corresponding to longest and shortest exposure times; and photoresponsive means for moving said other setting member in said one range of positions of said selector means as a function of the intensity of scene light to thereby select the size of the aperture in response to movement of said other setting member with reference to said one setting member and to simultaneously select the exposure time in response to adjustment of said retarding means by said cam means.

2. A structure as set forth in claim 1, wherein said motion transmitting means comprises a pair of motion transmitting portions one of which abuts against a portion of said one setting member when said selector means is moved to one of said one range of positions.

3. A structure as set forth in claim 1, wherein said motion transmitting means comprises a projection provided on said selector means and each of said setting members also comprises a projection, the projection of said selector means being disposed between the projections of said setting members.

4. A structure as set forth in claim 1, wherein said other setting member is arranged to automatically select a single predetermined exposure time in response to movement of said selector means to said other range of positions.

5. A structure as set forth in claim 4, wherein said predetermined exposure time is between said shortest and longest exposure times.

6. A structure as set forth in claim 1, wherein said setting members are concentric rings and wherein said selector means is movable to a third range of positions in which the camera is set for manual selection of exposure values.

7. A structure as set forth in claim 6, wherein said other range and said third range of positions of said selector means are mirror symmetrical with reference to said one range of positions and wherein said one range of positions includes a single position of said selector means.

8. A structure as set forth in claim 6, further comprising retaining means for determining the exposure time independently of said cam means in said third range of positions of said selector means.

9. A structure as set forth in claim 8, wherein said one setting member comprises means for blocking the operation of said retaining means in each but said third range of positions of said selector means.

10. A structure as set forth in claim 1, wherein said motion transmitting means comprises two motion transmitting portions and each of said setting members comprises a projection abutting against one of said motion transmitting portions in the one range of positions of said selector means, and further comprising fixed stop means disposed between said projections, one of said projections engaging said stop means in response to movement of said selector means from said one range of positions so that the corresponding setting member is held against movement with the other setting member with resulting changes in the size of said aperture.

11. A structure as set forth in claim 10, wherein said selector means is movable to a third range of positions in which the camera is set for manual selection of exposure values, said other and third ranges of positions being disposed at the opposite sides of said one range of positions, the projection of said other setting member abutting against said stop means in said other range and the projection of said one setting member abutting against said stop means in said third range of positions of said selector means.

12. A structure as set forth in claim 11, wherein one of said motion transmitting portions moves the projection of said other setting member in response to movement of said selector means from said one to said third range of positions and the other motion transmitting portion moves the projection of said one setting member in response to movement of said selector means from said one to said other range of positions of said selector means.

13. A structure as set forth in claim 1, wherein said setting members comprise first projections which abut against each other in said one range of positions of said selector means and second projections which abut against a pair of motion transmitting portions of said motion transmitting means in said one range of positions, and further comprising stationary stop means disposed between said second projections, the second projection of said other setting member abutting against said stop means in the other range of positions of said selector means.

14. A structure as set forth in claim 13, wherein said selector means is movable to a third range of positions to thereby effect manual selection of exposure values, said other range and said third range of positions being located at the opposite sides of said one range of positions and the second projection of said one setting member abutting against said stop means in response to movement of said selector means to said third range of positions.

15. A structure as set forth in claim 14, wherein one motion transmitting portion of said motion transmitting means moves the second projection of said one setting member in response to movement of said selector means from said one to said other range of positions and the other motion transmitting portion of said motion transmitting means moves the second projection of said other setting member in response to movement of said selector means from said one to said third range of positions.

16. A structure as set forth in claim 1, wherein said biasing means comprises a contraction spring having two end portions each connected with one of said setting members, each of said setting members comprising a ring and said rings being mounted for rotation about the optical axis of the camera objective.

17. A structure as set forth in claim 1, wherein said cam means is arranged to place said retarding means into a condition corresponding to the shortest exposure time in response to movement of said selector means to said one range of positions.

18. A structure as set forth in claim 1, wherein said cam means is arranged to place said retarding means into a condition corresponding to the longest exposure time in response to movement of said selector means to said one range of positions.

19. A structure as set forth in claim 1, wherein said exposure time determining means further comprises control means operatively connected with said retarding means and having follower means arranged to track said cam means, and resilient means for biasing said follower means against said cam means.

20. A structure as set forth in claim 1, wherein said selector means is a ring which is rotatable about the optical axis of the camera objective and said motion transmitting means comprises a projection for moving said one setting member with reference to said other setting member in response to movement of said ring within said other range of positions.

References Cited

UNITED STATES PATENTS 3,056,340    10/1962    Kiper.
3,125,010    3/1964    Winkler et al.
3,380,356    4/1968    Kiper et al.

OTHER REFERENCES

Kiper, German printed application 1,158,827, Dec. 5, 1963 (Kl. 57A 32/04).

NORTON ANSHER, Primary Examiner.

JOSEPH F. PETERS, Jr., Assistant Examiner.

U.S. Cl. X.R.

95—64